US005748906A

United States Patent [19]

Sandig

[11] Patent Number: 5,748,906
[45] Date of Patent: May 5, 1998

[54] ELECTRONIC TELEPHONE DIRECTORY WITH INTERCHANGEABLE LISTINGS

[75] Inventor: Bruce Sandig, Phoenix, Ariz.

[73] Assignee: Infopak, Inc., Phoenix, Ariz.

[21] Appl. No.: 229,147

[22] Filed: Apr. 18, 1994

Related U.S. Application Data

[63] Continuation of Ser. No. 696,948, May 8, 1991, abandoned.
[51] Int. Cl.⁶ ................................................. G06F 15/08
[52] U.S. Cl. .......................... 395/251; 395/282; 395/794
[58] Field of Search ....................... 364/419.07, 419.11, 364/419.19

[56] References Cited

U.S. PATENT DOCUMENTS 4,218,760  8/1980  Levy ............................. 364/DIG. 1

FOREIGN PATENT DOCUMENTS

| 0404451 | 6/1990 | European Pat. Off. ....... H04M 1/274 |
| 0404452 | 6/1990 | European Pat. Off. ....... H04M 1/274 |
| 296449 | of 0000 | Japan . |
| 370343 | of 0000 | Japan . |

*Primary Examiner*—Jack B. Harvey
*Assistant Examiner*—David A. Wiley

[57] ABSTRACT

A hand-held electronic telephone directory incorporating microprocessor control and read only memory for storage of directory information. The name of a particular party listed in the directory is typed into a keyboard. The name, address and telephone number then appears on the LCD display. The read-only memory is plugable in the device so that the listing of the desired calling area may be selectively installed.

19 Claims, 3 Drawing Sheets

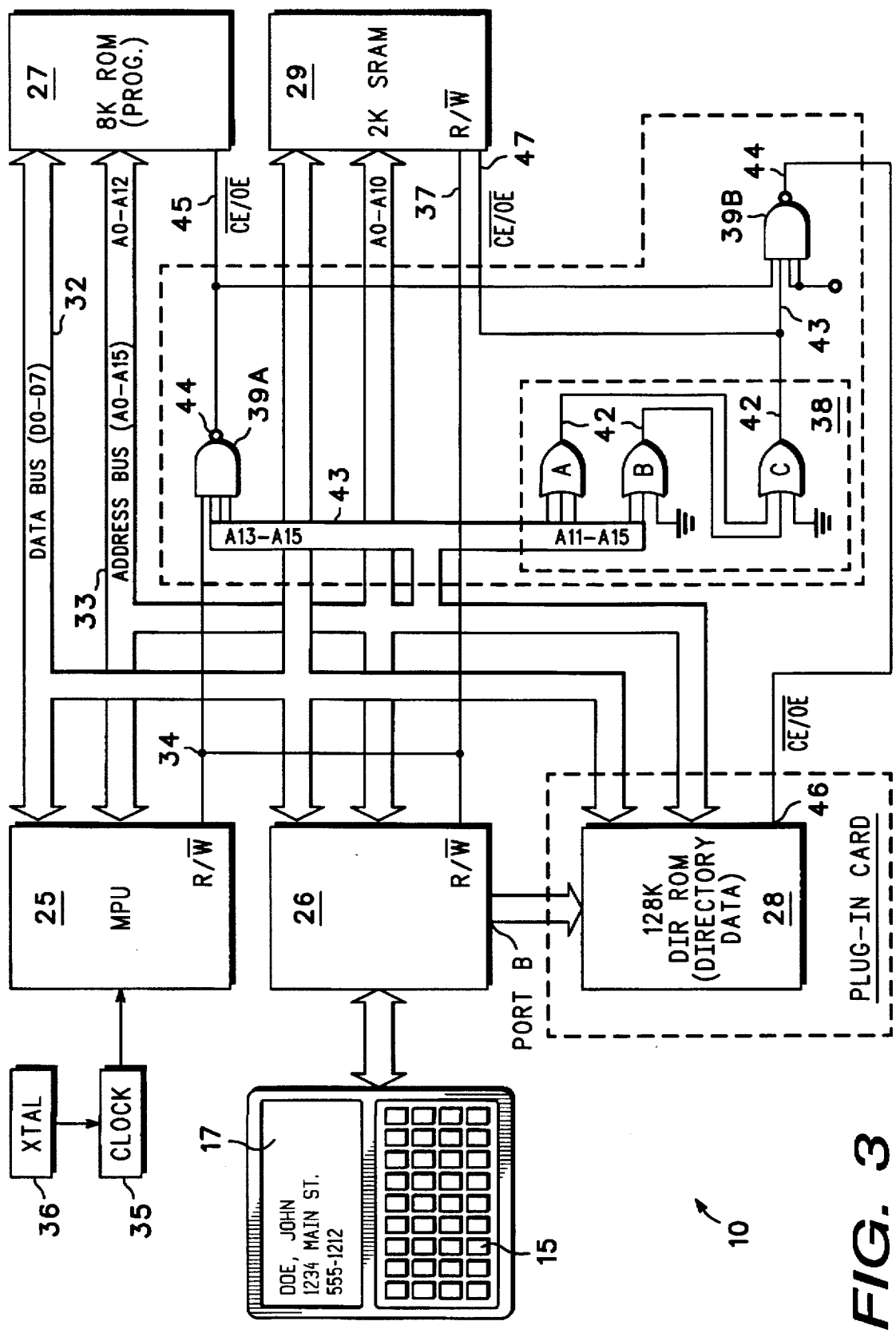

ELECTRONIC TELEPHONE DIRECTORY WITH INTERCHANGEABLE LISTINGS

This application is a continuation of prior application Ser. No. 07/696,948 filed May 8, 1991., now ABN.

BACKGROUND OF THE INVENTION

Numerous convenience features are being incorporated in the latest telephone equipment. These include automatic dialing, last-number redial, storage means for frequently called numbers, answering machines, etc. Cordless phones and cellular phones are also becoming increasingly popular.

There remains, however, a source of inconvenience that is particulary vexing for all telephone users. Before a call can be placed, it is first necessary to know the telephone number. Unless it is a number that is frequently called, this entails a time-consuming search through a large telephone book. For people such as realtors and other types of sales persons who tend to conduct much of their business from automobiles, it is still necessary to carry along the large and voluminous telephone directory. Before a particular business call can be made on the ultra-modern, many-featured cellular phone, the operator must pull off the road and leaf through hundreds of pages of directory listings to find the desired telephone number.

The economical availability of electronic devices such as Read-Only-Memory (ROM) and the Micro-Processor offers immediate relief from this particular inconvenience. The present invention describes the application of such devices in the creation of a small, hand-held telephone directory which replaces the large printed directory and removes the inconveniences associated therewith.

DESCRIPTION OF THE PRIOR ART

Various related prior art devices have been offered and described in the patent record.

Borges et al. disclose in U.S. Pat. No. 4,839,919 a telephone system having a keyboard, an alpha-numeric display, a programmed data processing unit, a read only memory and a random access memory. A name typed on the keyboard is displayed on the alpha-numeric display and automatically dialed. These functions and features are incorporated in a telephone set.

Japan patent 22153 discloses a telephone system in which the data of an individual telephone book is stored on an integrated circuit card which users carry individually. This card is employed in connection with a specially adapted telephone system.

Japan patent 53552 discloses an automatic dialing system having a "read" section which reads the content of an attachable/detachable storage medium.

Japan patent 130955 discloses an electronic telephone book in which a device reads telephone book data from a memory card and transmits an optional dial signal.

SUMMARY OF THE INVENTION

In accordance with the invention claimed, an electronic telephone directory is provided in the form of a compact, portable, hand-held device, the data-storage cartridge of which is a plug-in card containing the directory information of an entire city or geographic area.

It is, therefore, one object of the present invention to provide an improved electronic telephone directory.

A further object of the invention is to provide such an electronic telephone directory in the form of a small, portable, hand-held unit that will readily fit into a purse, brief-case or glove compartment of an automobile.

A still further object of the invention is to provide such a directory in a form which may be mass produced in a standard form and then rendered specifically operable for a particular city or calling area through the programming of a plug-in memory card.

A still further object of the invention is to provide such a directory in a form which incorporates a minimum of essential features so that it will be simple to operate, using a procedure which mirrors the searching procedure employed in the use of a conventional telephone book.

A still further object of the invention is to provide such a directory in a form incorporating a keyboard for entering the name of the party to be called, and a display area which displays the name as it is entered, then the address and the telephone number that is extracted from the stored directory.

A still further object of the invention is to provide such a directory in a form which very drastically reduces the time required to obtain the information from the conventional telephone book.

A still further object of the invention is to provide an auxiliary memory in which certain additional information may be stored such as unlisted numbers or personal data.

Yet another object of the invention is to provide such a directory in a very inexpensive form so that it may be economically available to a broad segment of the general population.

Further objects and advantages of the invention will become apparent as the following description proceeds, and the features of novelty which characterize the invention will be pointed out with particularity in the claims annexed to and forming a part of the specification.

BRIEF DESCRIPTION OF THE DRAWINGS

The present invention may be more readily described with reference to the accompanying drawings, in which:

FIG. 3 is a block diagram illustrating the electrical or electronic organization of the electronic telephone directory of the invention.

DESCRIPTION OF THE PREFERRED EMBODIMENT

Figure 1:
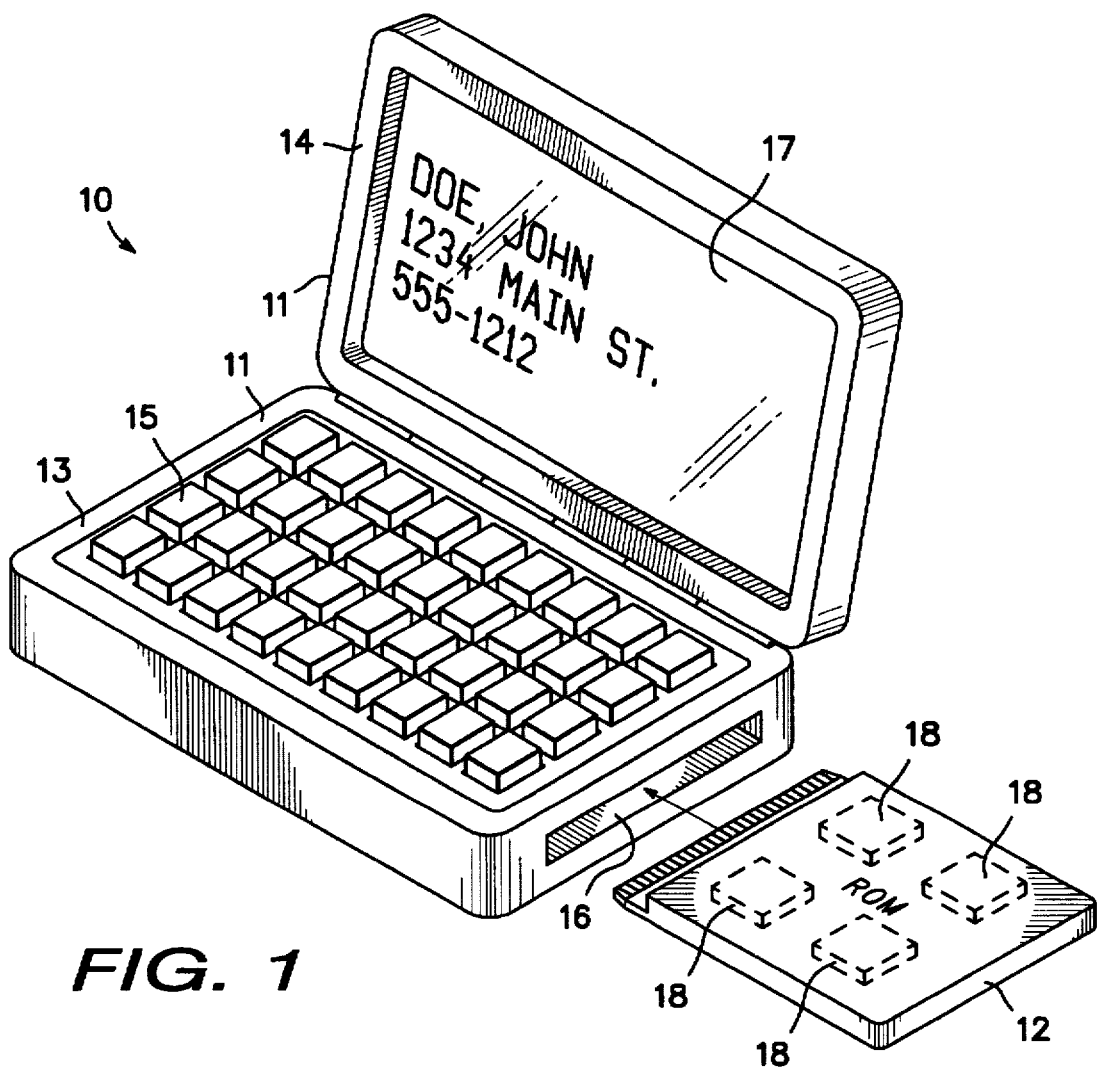
FIG. 1 is a perspective view showing a first version or embodiment of the invention employing a hinged structure which permits the folding of the unit into a more compact package when the unit is not in use.

Referring more particularly to the drawings by characters of reference, FIG. 1 discloses the physical features of the invention in which the electronic telephone directory 10 of the invention is shown to comprise a hinged case 11 and a plug-in card 12.

Case 11 comprises a main housing 13 and a hinged cover 14. Housing 13 carries a keyboard 15, a major part of the electronic circuits (not shown) and a card receptacle or socket which is accessible via a slot or opening 16 in one end of housing 13. A liquid crystal display (LCD) 17 is mounted on the hinged cover 14.

Plug-in card 12 carries a number of integrated circuit read-only-memory (ROM) devices 18. Directory information specific to a given city or calling area is stored in the devices 18. The directory 10 may thus be rendered operational for a given calling area through the installation of the appropriately programmed card 12.

With the directory card installed, the user simply types in the name of the party to be called, using keyboard 15. The name, address and telephone number then appear on the LCD display 17.

Figure 2:
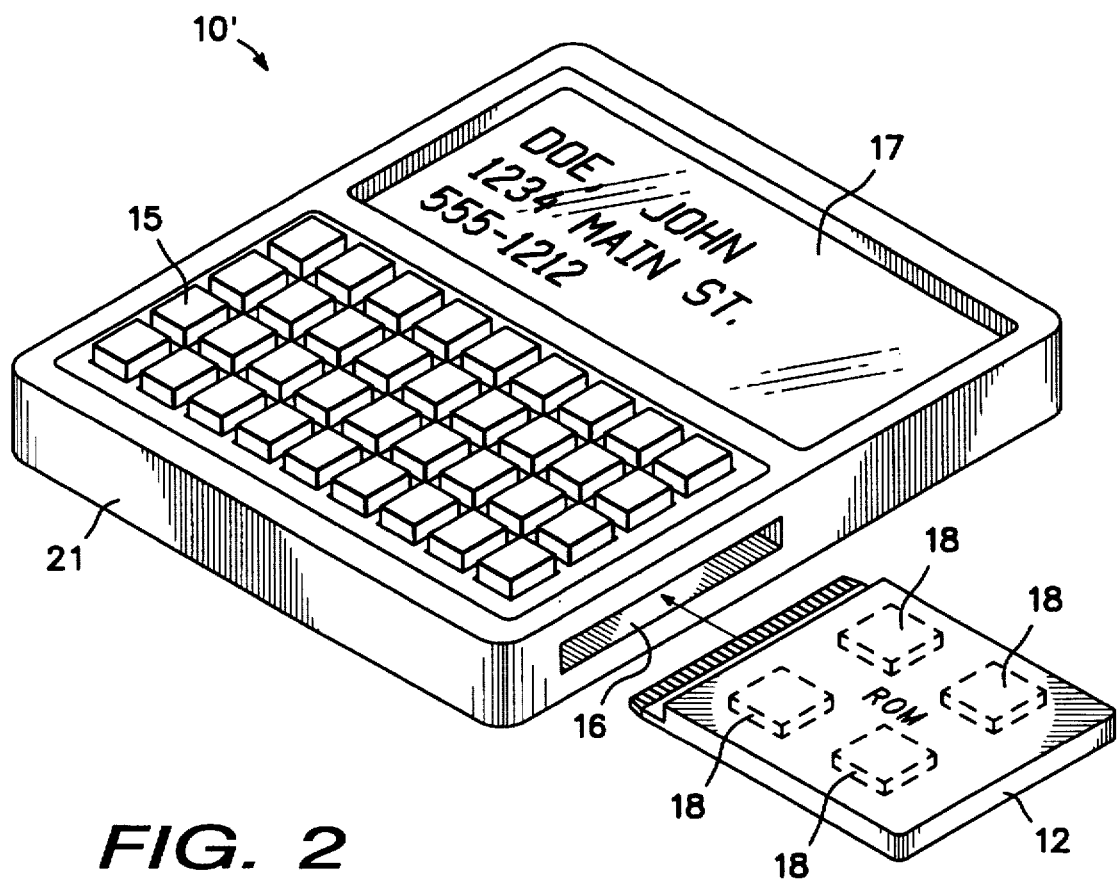
FIG. 2 is a perspective view showing a second version or embodiment of the invention in a simpler and potentially less expensive form not employing the hinged arrangement.

A simpler and less expensive embodiment of the invention is shown in FIG. 2, wherein the directory 10' comprises a simple housing 21 which carries both the keyboard 15 and the LCD display 17. The card 12 is again installed through a slot 16 in one end of housing 21.

While the hinged arrangement of FIG. 1 results in a more compact unit for given dimensions of the keyboard and the display, its construction is inherently more expensive than the simpler arrangement of FIG. 2. The added costs for the hinged unit results from the need for making electrical signal connections from the main housing to the LCD in the hinged cover.

The electrical system of the electronic telephone directory 10 as shown in FIG. 3 comprises a microprocessor unit (MPU) 25, a means for providing input/output functions such as, for example, peripheral interface adapter (PIA) 26, a first read only memory (ROM) 27, a second read only memory (ROM) 28, a static random access memory (SRAM) 29, read/write decoding network 31, an alpha-numerical keyboard 15 and an alpha-numerical and graphic LCD display 17. The MPU 25, PIA 26, ROM 27, ROM 28, and SRAM 29 are interconnected by a data bus 32, an address bus 33, a control bus 34 and the read/write decoding network 31.

The MPU 25 may be an ordinary commercially available microprocessor such as the 6502 (available from various integrated circuit manufacturers). It incorporates the functions of a central processing unit, including an arithmetic unit, internal registers and a control unit. Its operation is synchronized by means of a clock 35 which is integral with the MPU. The frequency at which the clock operates is regulated by an external crystal 36. The clock frequency for the 6502 is typically one megahertz.

ROM 27 is the program ROM. It contains the operational program for the system, comprising a set of sequential instructions prepared to meet the operational requirements of the specific application. These instructions are permanently installed in the ROM at the manufacturing facility. The instructions are permanent in the sense that they do not disappear when power is lost or when the system is powered down.

ROM 28 is the same general type of device as ROM 27 but it has a much larger storage capacity as required for its intended function as the storage medium for the telephone directory data. For a large city, the estimated capacity required in ROM 28, for example, may be as high as 8 megabytes. For a limited calling area or a selected listing of numbers, a much smaller capacity might suffice such as, for example, the 128K capacity of the 27010.

SRAM 29 is the read/write memory for the system. Information needed to be stored only temporarily during the performance of operating cycles is stored in the SRAM. The static random access memory (SRAM) is preferred for this application over other types of random access memory (RAM) because it does not require refreshing. (The SRAM employs flip-flops as storage elements while the RAM employs capacitors which need to be recharged periodically.)

PIA 26 may be an input and output (I/O) interface for transmitting data to and from the keyboard.

ROM 27, ROM 28 and SRAM 29 are controlled by Chip Enable/Output Enable ($\overline{CE/OE}$)signals. These control signals are generated by the MPU and the PIA and are directed by means of address information from bus 33 together with decoding network 31. To read data from any one of these devices the address data must first be present on bus 33. The $\overline{CE/OE}$ input of the addressed memory device is then set low. This causes the data present at the addressed location to be presented to the data bus 32 from which it is available to the MPU or the PIA. In the case of the SRAM, the information will be read at the addressed location, or new data will be written into the addressed location, depending upon the state of the R/W signal present at the R/W input 37. If the R/W signal is low, data is written in from the data bus; if the R/W signal is high, data from the addressed location is read out to the data bus. For either the read or the write operation to be effected, the $\overline{CE/OE}$ signal at the memory input must be low. Because a common set of address lines (address bus 33) is employed to address the ROMs 27 and 28, SRAM 29 and PIA 26, the read/write decoding network 31 is required to "map" the locations of each of these elements in the total address area covered by the 16 address lines of bus 33.

Decoding network 31 comprises a triple three-input OR gate 38 and a double quad-input NAND gate 39A, 39B.

Each of the OR gates has three inputs and one output 42. If any or all of the inputs are high, the output is high; if all inputs are low, the output is low.

Each of the NAND gates (39A or 39B) has four inputs 43 and one output 44. The output is low only when all four inputs are high. For all signal levels on data bus 32, address bus 33 or control line 34, a high level (typically 4volts) is greater than 2.8 d-c and a low level is less than 0.8 volts d-c.

As shown in FIG. 3, NAND gates 39A provides control of the $\overline{CE/OE}$ input 45 of ROM 27. Three inputs of gate 39A are connected to address lines A13–A15 (the three most significant bits of the 16 bit address bus 33). When these three lines are high and R/W line 34 is also high the output 44 of gate 39A will be low so that $\overline{CE/OE}$ input 45 is low, enabling ROM 27. This causes the data stored in ROM 27 at the address present on address bus lines AO-A12 to be read out on data bus 32. Under this condition (output of gate 39A low), the upper input of gate 39B is low. The output of gate 39B (which is connected to the CE/OE input 46 of ROM 28) is high, so that access to ROM 28 is thereby prevented while ROM 27 is accessed.

OR gates 38A, B and C are connected to form a composite five-input OR gate. Address lines A11, A12 and A13 are connected to the three inputs 41 of gate 38A and lines A14 and A15 are connected to two of the inputs of gate 38B. The third input of gate 38B is connected to ground. The output of gate 38A is connected to one input of gate 38C, the output of gate 38B is connected to a second input of gate 38C and the third input of gate 38C is connected to ground. Now if one or more of lines A11–A13 are high, the output of gate 38A will be high causing one input and hence the output of gate 38C to be high. Similarly, if either or both of lines A14, A15 are high, the output of gate 38B will be high causing the second input and again the output of gate 38C to be high. The output of gate 38C (which is connected to the $\overline{CE/OE}$ input 47 of SRAM 29) is thus seen to be high if any one of the lines A11–A15 is high. SRAM 29 is thus enabled only when all five address lines A11–A15 are low.

ROM 28 is enabled for access when the output 44 of gate 39B is low. It will be noted that two of the four inputs 43 are connected to +5 VDC. Output 44 will thus be low when the other two inputs are high. One of the other two inputs is connected to the output of gate 38C and the $\overline{\text{CE/OE}}$ input of SRAM 29; the other input is connected to the output of gate 39A and the CE/OE input of ROM 27. When either of these inputs is low, the output of gate 39B will be high, preventing access to ROM 28. It is thus seen that ROM 28 is enabled only when neither ROM 27 nor SRAM 29 is enabled.

The "mapping" arrangement just described assigns address locations for ROMs 27 and 28 and for SRAM 29 which are denoted in base 16 software terminology as location $E000 for the program ROM 27, and location $0000 for SRAM 29. This arrangement was a result of a hardware stack of MPU 25 being located at location $0100 and the desire to make use of zero page addressing.

ROM 28 which stores etc. directory information has been mapped in a contiguous 32K byte block starting at address $6000. The block diagram of FIG. 3 shows only one 128K ROM, which equals four 32K banks. Two lines of port B of the PIA are being used to select any one of the four banks. This may require additional control circuits for a particular PIA 26 which may not be adaptable to such an arrangement.

Additional address decoding (not shown in FIG. 3) is required to map PIA 26 to a particular address. A scheme similar to that employed for decoding network 31 may be used for this purpose.

In a first implementation of the invention, the following part types were employed:

|  | Part Type |
|---|---|
| MPU(25): | 6502 |
| 8K ROM(27): | 4164 |
| 128K ROM(28): | 27010 |
| 2K SRAM(29): | 2016 |
| OR gate(38): | 4075 |
| NAND gate(39): | 74HC20 |
| PIA(26): | 6520 |

During the acquisition of a telephone number by a user of the directory 10 the following operational steps occur:

1) The device 10 is first enabled by turning on power or pressing a reset button or opening the hinged cover.

2) The operator then proceeds to type in the name of the party to be called using keyboard 15.

3) The code representing the name is stored in SRAM 29.

4) The MPU 25 compares the code stored in SRAM 29 with data stored in ROM 28, moving through successive address locations.

5) When a match is found, the matching data pattern is converted to the corresponding name, address and telephone number and presented on LCD display 17.

6) If no match is found, the display 17 reports "NO LISTING FOUND".

The foregoing operations are performed under the control of MPU 25 which follows a sequential set of instructions that have been permanently stored in ROM 27 as "firmware". After each individual operation is completed, a counter in MPU 25 is indexed to the next higher operation number. The indexed instruction number causes the MPU to move to the next instruction.

Variations in the foregoing operational steps may be achieved through appropriate design of the operating instructions stored in ROM 27. It is possible, for example, to first type in only a last name such as "SMITH". The first name in the listing with the last name "SMITH" would then appear on display 17. A button on keyboard 15 which is coded to drive a "scrolling" or "paging" action would then cause successively listed names with the surname "SMITH" to be displayed, one at a time, each time the button is pressed. A portion of the SRAM may also be reserved for storage of unlisted numbers, personal memos, etc.

For additional information concerning the operation and programming of microprocessor controlled equipment, see PROGRAMMING THE 6502 by Rodnay Zaks (Library of Congress Card Number: 78-61788)

It should be noted that even though this invention has been described as a device for processing telephone directory data, it could be useable with any other data base such as real estate listings and still fall within the scope of this invention.

What is claimed is:

1. A method for accessing telephone numbers corresponding to a telephone book, the methods comprising the steps of:

receiving at least one plug in memory card that stores the telephone numbers corresponding to at least one telephone book;

coupling said at least one plug in memory card to a portable electronic telephone directory wherein said at least one plug in memory card includes only data corresponding to a telephone book;

entering a name to said portable electronic telephone directory; and using electronics within the portable electronic telephone directory to search said at least one plug in memory card for said name wherein a telephone number corresponding to said name is provided when said name is found.

2. The method as recited in claim 1 wherein said step of entering a name includes a step of entering a name via a keypad on said portable electronic telephone directory.

3. The method as recited in claim 1 further including displaying said telephone number corresponding to said name.

4. The method as recited in claim 1 further including displaying that said name is not found in said at least one plug in memory card.

5. A portable electronic telephone directory for providing access to telephone numbers corresponding to a telephone book, comprising:

internal electronics including:
a microprocessor unit; and
memory for storing program code;

a keypad coupled to said microprocessor unit for entering a name;

a display coupled to said microprocessor unit; and a port for receiving a plug in memory card, wherein said plug in memory card is used to store only phone numbers and information substantially equal to information included within the telephone book and wherein said internal electronics are used to search the information stored on said plug in memory card for said name wherein a telephone number corresponding to said name is provided when said name is found on said plug in memory card.

6. The portable electronic telephone directory as recited in claim 5 further including a housing for enclosing said internal electronics and for mounting said keypad and display.

7. The portable electronic telephone directory as recited in claim 6 further including a slot formed in said housing for receiving said plug in memory card when coupling to said port.

8. The portable electronic telephone directory as recited in claim 7 further including a slot formed in said housing for receiving said memory card when coupling to said port.

9. The portable electronic telephone directory as recited in claim 5 wherein said plug in memory card is coupled to said port for providing telephone numbers to said microprocessor.

10. The portable electronic telephone directory as recited in claim 9 wherein a name is entered via said keypad and wherein said internal electronics searches said plug in memory card for said name.

11. The portable electronic telephone directory as recited in claim 10 wherein a name is entered via said keypad and wherein said microprocessor searches said memory card for said name.

12. The portable electronic telephone directory as recited in claim 11 wherein the electronic telephone directory indicates when said name is not found in said plug in memory card.

13. The portable electronic telephone directory as recited in claim 5 wherein said plug in memory card comprises ROM.

14. A portable electronic telephone directory system for providing access to telephone numbers corresponding to a telephone book, comprising:

an external plug in memory card for storing only telephone numbers and information substantially equal to information included within a telephone book; and a housing including:

internal electronics including a microprocessor unit and memory for storing program code;

a keypad coupled to said microprocessor unit for entering a name;

a display coupled to said microprocessor unit for displaying information; and a port for receiving said external plug in memory card, wherein said internal electronics are used to search said external plug in memory card for said name when inserted into said port of said housing wherein a telephone number corresponding to said name is provided when said name is found on said external plug in memory card.

15. The portable electronic telephone directory system as recited in claim 14 further including a plurality of external plug in memory cards each one respectively corresponding to different telephone books within different calling areas.

16. The portable electronic telephone directory system as recited in claim 14 wherein said external plug in memory card comprises read-only memory (ROM) such that the telephone numbers and information stored thereon are not lost when the system is powered down.

17. The portable electronic telephone directory system as recited in claim 14 wherein a name is entered via said keypad and wherein said internal electronics, under control of said program code, searches said external plug in memory card for said name.

18. The portable electronic telephone directory system as recited in claim 14 wherein the portable electronic telephone directory system displays a telephone number corresponding to said name when said name is found in said external plug in memory card.

19. The portable electronic telephone directory system as recited in claim 14 wherein the electronic telephone directory system indicates when said name is not found in said external in plug memory card.

* * * * *